United States Patent Office 3,454,570
Patented July 8, 1969

3,454,570
PROCESS FOR PREPARING EPOXYALKYL
DERIVATIVES
Carl G. Schwarzer, Walnut Creek, Calif., assignor to
Shell Oil Company, New York, N.Y., a corporation of
Delaware
No Drawing. Filed Dec. 9, 1966, Ser. No. 600,355
Int. Cl. C07d 1/02; C07f 9/34
U.S. Cl. 260—248         11 Claims

ABSTRACT OF THE DISCLOSURE

This invention relates to a method for preparing epoxyalkyl derivatives of carbamidyl compounds having within their structure at least one group

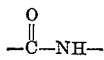

The process comprises reacting the carbamidyl compounds, such as, for example, urea, cyanuric acid, and the like with an epoxy-halo-substituted alkane, such as epichlorohydrin, in the presence of a phosphonium halide catalyst which will be clearly defined hereinbelow and dehydrohalogenating the resulting product. The resulting glycidyl derivatives may be cured to form valuable resin products.

---

The reaction of epichlorohydrin with cyanuric acid to produce glycidyl isocyanurates is well known. Such reactions are described, for example in U.S. Patent No. 2,809,942. The catalysts used in the reactions comprise organic bases such as tertiary amines, quaternary ammonium compounds and the like. The products are described as glycidyl cyanurates and particularly polyglycidyl cyanurates.

Although glycidyl isocyanurates are valuable compounds which can be cured to form products which are useful in a number of applications, they have certain drawbacks. Specifically when prepared in the presence of organic base materials such as the tertiary amines, etc., the unrefined products have poor shelf life due to loss of functional epoxy groups. The deterioration is evidently due to the presence of residual base catalyst materials in the product composition which bases are known to catalyze epoxide polymerization. Thus, even at room temperature, the stability of the polyglycidyl isocyanurates is relatively poor and the products become viscous and finally harden thereby rendering them useless in applications where low viscosity and high epoxy equivalency is desirable.

In order to avoid the instability problems, it has often been the practice to recrystallize the glycidyl isocyanurates prepared from the basic reaction catalysts, thereby more completely separating the residual epoxide polymerization catalyst from the product mixture. These purified and crystalline materials are known to have excellent stability as compared to the untreated products. However, such recrystallization treatments require expensive additional processing involving loss of up to about one-half of the original polyglycidyl isocyanurate. Obviously, on a commercial scale such results are undesirable.

It is an object of this invention to provide a method for preparing polyepoxyalkyl isocyanurates and related materials the products of which have good thermal stability and shelf life. It is also an object to provide a method for reacting an epoxy-halo-substituted alkane with cyanuric acid, urea or similar materials such as pyromellitic diimide in which the reaction is quite rapid and economical. These and other objects will become evident from the following description of the invention.

According to the present invention, epoxy compounds are prepared by reacting an epoxy-halo-substituted alkane with a carbamidyl compound in the presence of a phosphonium halide catalyst and thereafter dehydrohalogenating the intermediate composition.

The carbamidyl compounds are those having at least one carbamidyl group including the cyclic carbamides. Specifically, the carbamidyl compounds are those having at least one group

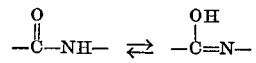

or

within its structure. Such compounds include urea, N-hydrocarbyl ureas such as N-methyl urea, N-ethyl urea, N-phenyl urea, N,N'-dimethyl urea, N,N'-diphenyl urea, methylol urea and the like, acetamide, methylacetamide, uric acid, pyrimidines such as uracil, cytosine and thymine, cyanuric acid and isocyanuric acid.

The epoxy-halo-substituted alkanes used in the process are those alkanes having a vic-epoxy group

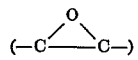

attached directly to a halogen substituted carbon atom. Examples include, epichlorohydrin, epibromohydrin, 1,4-dichloro-2,3-epoxybutane, 1-chloro-2,3-epoxypentane, etc. The epoxy-halo-substituted alkanes containing no more than 12 and preferably 3 to 8 carbon atoms are preferred. Epichlorohydrin comes under special consideration because of its availability and ease of reaction. For simplicity, the epoxy-halo-substituted alkane will be referred to as epichlorohydrin, although the broader scope of reactants as set forth above should be appreciated.

The phosphonium halide catalysts useful in the process are those of the formulae

wherein each R and R' is the same or a different hydrocarbyl group of from 1 to about 20 carbon atoms and may be aliphatic, cycloaliphatic or aromatic including those wherein 2 or 3 of the R groups are joined together to form a heterocyclic tertiary phosphonium compound. Also included are the substituted hydrocarbon groups containing in addition to carbon and hydrogen, other atoms such as sulfur, oxygen, nitrogen, halogens which may be present, for example, in alkoxy, carboalkoxy, acyl, haloalkyl, cyano, halo and amino groups. In the formulae, X is a halogen atom.

Illustrative examples of aliphatic R groups include methyl, ethyl, propyl, isopropyl, butyl, pentyl, hexyl, cyclohexyl, nonyl, dodecyl, lauryl, stearyl, 2-chloroethyl, methoxymethyl, 3-(diethylamine)propyl, etc. Aromatic R groups include phenyl, tolyl, xylyl, p-ethylphenyl, p-tert-butylphenyl, 2,4-diethylphenyl, p-phenylphenyl, 2,4,6-trimethylphenyl, m-chlorophenyl, p-propoxyphenyl, 2,4-dichlorophenyl, m-diethylaminophenyl, 3,5-butoxyphenyl, etc. R' is preferably from 1 to about 8 carbon atoms and more preferably lower alkyl such as methyl, ethyl, isopropyl, etc.

Illustrative examples of the phosphonium salts include, among others, methyl triphenylphosphonium chloride, methyl triphenylphosphonium bromide, methyl trilaurylphosphonium bromide, methyl phenyl dilaurylphosphonium bromide, methyl 1,6-bis(diphenylphosphino) hexane bromide, ethyl triphenylphosphonium chloride, methyl trilaurylphosphonium iodide, dimethyl diphenylphosphonium bromide, methyl triphenylphosphonium iodide butyl triphenylphosphonium chloride and the like, and mixtures thereof. These phosphonium halides can be prepared by known methods of adding a hydrocarbyl halide to the hydrocarbyl phosphine and heating the mixture.

The amount of phosphonium salt used to catalyze the reaction may be between about 0.1 and about 10% by weight based on the carbamidyl containing compound with higher amounts of catalyst requiring shorter reaction times.

It is also within the scope of the present invention to form phosphonium salts in situ. For example, by adding a phosphine to the reaction mixture containing the carbamidyl compound and epoxy-halo-substituted alkane, the phosphonium halide is formed in the reaction mixture and may act as the desired catalyst. Phosphines that can be used include, among others, triphenyl phosphine, trilauryl phosphine, tricyclohexyl phosphine, trioctyl phosphine, methyl diphenyl phosphine and the like, and mixtures thereof. In this case, the phosphine is added in the same proportions as the phosphonium salts noted above, i.e., from about .1% to 10% by weight based on the carbamidyl compound.

The ratio of the carbamidyl compound to epoxy-haloalkane used will depend on the type of the carbamidyl compound used and on the particular product desired. For example, there are three possible reaction sites on the cyanuric acid molecule available for reaction with epoxyhalo-alkane. For example, where triglycidyl isocyanurate is to be produced the stoichiometric mole ratio of reactants (cyanuric acid:epichlorohydrin) is 1:3. Where urea is the carbamidyl compound to be used, there are four possible epichlorohydrin reaction sites where the polyepoxide product is desired. Thus, a stoichiometric urea:epichlorohydrin ratio of 1:4 would be used. However, to ensure complete reaction it is preferred to use at least a slight excess of epichlorohydrin over the stoichiometric amount necessary, to react with the desired available reaction sites on the carbamidyl compound.

In preparing the polyepoxyalkyl carbamidyl compounds according to the invention, the reactants and phosphonium salt catalyst may merely be mixed together and heated to induce reaction with the epoxy-halo-alkane being essentially the only solvent present. Other non-reactive solvents may be used, however, such as methanol, ethanol, isopropanol, sulfolane and the like.

Reaction temperatures are suitably between about 50 and 200° C. with temperatures between about 100 and 150° C. being preferred. Reaction times will vary depending on the particular reactants and catalyst used.

The reaction products are the halohydrin intermediates which must be dehydrohalogenated to obtain the polyepoxides. This treatment comprises treating the polychlorohydrin with a basic material such as an alkali or alkaline earth metal oxide or hydroxide and the like. Such a procedure is well known to those skiled in the art. This dehydrohalogenation step may be performed by merely adding an aqueous caustic solution directly to the reaction mixture preferably while keeping the amount of water present at a minimum in order to avoid hydrolysis of the epoxide groups. Although the salts formed may be filtered out and remaining epichlorohydrin is then removed by distillation leaving the polyglycidyl urea compound, it is preferred to remove them by aqueous extraction because it gives better thermal stability. It may be preferred to use a slight mol excess of base material over the amount of stoichiometric necessary to dehydrohalogenate the intermediate polychlorohydrins in order to ensure complete conversion to the polyepoxide. A 5-10% mol excess is quite satisfactory.

As a preferred embodiment of the invention, a polyhydric phenol, such as 2,2-bis(4-hydroxyphenyl)propane, is added to the reaction mixture containing the desired halohydrin and excess epoxy-halo-alkane prior to the dehydrochlorination. In this case, the excess epoxy-halo-alkane will react with the polyhydric phenol to form the epoxyalkyl ether of the polyhydric phenol in situ. Examples of the polyhydric phenol includes resorcinol, 1,3,5-trihydroxybenzene, 2,2-bis(4-hydroxyphenyl)butane, bis (4 - hydroxyphenyl)-sulfone, tetrakis(4 - hydroxyphenyl) ethane, and the like and mixtures thereof. These phenols are preferably added in amounts varying from about 10% to 60% by weight of the reaction mixture.

The resulting mixture of the epoxyalkyl derivative of the carbamidyl compound and the epoxyalkyl ether of the polyhydric phenol is preferred in many cases as it is a resinous product which can be used directly in the intended applications. The straight epoxyalkyl derivative of the carbamidyl compound, in some cases, tends to crystallize out and gives a product which requires melting or other treatment before it can be utilized as a resinous material. Also in many cases, the mixture of the epoxyalkyl ether and the epoxyalkyl derivative of the carbamidyl compound gives a more fluid product which is easier to utilize in the intended applications.

The products recovered after dehydrohalogenation are epoxyalkyl derivatives of the carbamidyl compounds having one or more

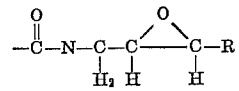

groups. These epoxyalkyl derivatives are quite useful for a number of resin applications due to their functional epoxide groups which may be cured to form castings, pottings, laminates, moldings, coatings, etc. In these applications they are cured to insoluble infusible products by reaction with conventional curing agents, such as amines, aminocontaining polymers, polybasic acids, acid anhydrides, salts, mercaptans, hydrazines, BF$_3$-complexes, and the like, and mixtures thereof. Specific examples of such materials include, among others, p-phenylene diamine, diaminodiphenyl-sulfone, p,p'-methylene dianiline, p,p-diaminodiphenylmethane, triaminobenzene, 2,4-diaminotoluene, tetraaminobenzene, 3,3'-diamino diphenyl, 1,3-diamino-4-isopropylbenzene, 1,3 - diamino-4,5 - diethylbenzene, diaminostilbene, triethylamine, ethylene diamine, diethylamine, diethylene triamine, triethylene tetramine, tetraethylene pentamine, pyridine, diaminopyridine, piperidine, N,N' - diethyl-1,3-propanediamine, dicyandiamide, melamine, fatty acid salts of amines, such as the 2-ethylhexoate of tris(dimethylaminomethyl)phenol adducts of polyepoxides such as those described hereinafter, and the above-described mono- and polyamines, as the adduct of p-phenylene diamine and styrene oxide, the adduct of p-phenylene diamine and allyl glycidyl ether, the adduct of diglycidyl ether of 2,2-bis(4-hydroxyphenyl)propane and diethylene triamine, the adducts of diethylene triamine and ethylene oxide, the adduct of diethylene triamine and styrene oxide, the adducts of polyamines and unsaturated nitriles, such as the adducts of polyamines and unsaturated nitriles, such as the adduct of diethylene triamine and acrylonitrile, the adduct of diethylene triamine and unsaturated sulfolanes, and the adduct of p-phenylene diamine and acrylonitrile.

Other examples include the amino-containing polyamides as described in U.S. Patent No. 2,450,940 and the monomeric amides described in U.S. Patent No. 2,832,799.

Other examples include the acid anhydrides, such as phthalic anhydride, succinic anhydride, dodecenylsuccinic anhydride, maleic anhydride, tetrahydrophthalic anhydride, pyromellitic anhydride, hexachlorophthalic anhydride, methyl Nadic anhydride, anhydrides otained by reacting maleic anhydride with unsaturated compounds, such as oils, terpinene, long chain unsaturated acids and the like as well as anhydrides obtained by reacting long chain acids with acetic anhydride and the like.

Still other examples include the salts, such as magnesium perchlorate, zinc fluoborate, potassium persulfate, copper fluoborate, cupric arsenate, zinc persulfate, cupric fluosilicate, cupric iodate, cupric sulfate, magnesium nitrate, magnesium phosphate, stannic fluoborate, zinc nitrate, and the like, as well as the chloride derivatives as aluminum chloride, zinc chloride, ferric chloride and the like.

Still other examples include the BF₃ adducts with various materials, such as amines, amides, ethers, phenols and the like.

The amount of the curing agents employed will also vary over a wide range. The amount of the curing agents having active hydrogen as well as the agents such as acid anhydrides are preferably employed so as to furnish at least .6 equivalent, and still more preferably, .8 to 1.5 equivalents per equivalent of the polyepoxide. As used herein in relation to the amount of curing agent, "equivalent" means that amount needed to furnish 1 active hydrogen or anhydride group per eqoxy group. The other curing agents, such as metal salts, tertiary amines, BF₃, and the like are preferably used in amounts varying from about .1% to 6% by weight of the material being cured.

In order to illustrate the manner in which the invention is carried out the following examples are provided. It is to be understood that the reactants and conditions are by way of illustration only and the scope of the invention should not be limited thereto. Unless otherwise indicated, parts are parts by weight.

EXAMPLE I

This example illustrates the preparation of triglycidyl isocyanurate by the process of the invention.

Into a reactor was placed 100 parts cyanuric acid and 1,042 parts epichlorohydrin to give an equivalent ratio of acid:epichlorohydrin of 1:4.9. The catalyst methyl triphenylphosphonium bromide (1.2 parts) was then injected into the reaction mixture which was thoroughly blended by stirring while the temperature was brought to about 120° C. and maintained for about 80 minutes under reflux conditions. After this time, sufficient water is added to bring the kettle temperature to 102–106° C. while under reflux. These conditions result in a water concentration of about 2% w. in the reaction mixture. Sodium hydroxide or a 46%–48% aqueous solution is added at a rate to maintain the kettle temperature within the defined limits while water is removed from the kettle as an epichlorohydrin azeotrope. After the caustic addition is complete the heating is continued for an additional 15–30 minutes to assure complete reaction.

Sufficient water is added at this point to dissolve 90–95% w. of the salt that has formed. The brine phase is the lower layer. The organic phase is then separated and washed with 200 parts of 5% by weight of aqueous monosodium phosphate followed by 200 ml. distilled water. After separating, the organic layer was then heated to 110° C. at 1 mm. pressure to remove the volatiles. The yield of this product was 89% of the theoretic amount. The product was purified by crystalizing the resinous material from 50% by weight of methanol solutions. The white crystalline product which was identified as triglycidyl isocyanurate had the following analysis:

| | Found | Theory for triglycidyl isocyanurate |
|---|---|---|
| Epoxide, equiv./100 g | .92 | 1.02 |
| Active hydrogen, equiv./100 g | 0.10 | |
| Chlorine, percent wt | 1.0 | |
| M.P. (° C.) | 85–95 | |

This product was heated at 100° C. for 115 hours in order to determine its stability. During that time the product lost only about 10% of its epoxide equivalence during that time indicating relatively high shelf stability.

EXAMPLE II

Example I was repeated with the exception that the methyl triphenylphosphonium bromide was replaced by each of the following: methyl phenyl dilauryl phosphonium bromide, methyl trilauryl phosphonium bromide and methyl trilauryl phosphonium chloride. Related results are obtained.

EXAMPLE III

Example I was repeated with the exception that the methyl triphenylphosphonium bromide was replaced by an equivalent amount of triphenyl phosphine. Related results are obtained.

EXAMPLE IV

Example I was repeated with the exception that before the sodium hydroxide was added to effect the dehydrochlorination, 10 parts of 2,2-bis-(4-hydroxyphenyl)propane were added to the reaction mixture. The resulting product is a viscous resinous mixture of the triglycidyl isocyanurate and diglycidyl ether of 2,2-bis(4-hydroxyphenyl)propane.

EXAMPLE V

The procedure of Example I was essentially repeated with urea being substituted for the cyanuric acid. The molar ratio of urea:epichlorohydrin utilized was 1:10. After dehydrohalogenating the chlorohydrin intermediate the calculated amount of salt was removed. The product was recovered in an 85% yield and had the following properties:

| | |
|---|---|
| Epoxide equiv./100 g. | 0.396 |
| Active hydrogen | 0.07 |
| Chlorohydrin, equiv./100 g. | 0.062 |
| Total chlorine | 6.8 |
| Nitrogen, percent weight | 11.2 |

EXAMPLE VI

The procedure as set forth in Example V was repeated with the substitution of uracil for the urea. The formula for uracil is

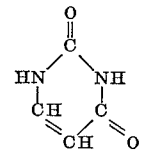

Thus 100 g. uracil (0.900 mol) and 900 g. epichlorohydrin were reacted using 1.5 g. of triphenyl phosphine as catalyst. Reaction was complete in 50 minutes at 120° C. and the product was a clear yellow-orange solution. This was dehydrohalogenated with aqueous 50% NaOH and a 100% yield was recovered which contained 56% of the calculated epoxide content and the product had the following analysis:

| | |
|---|---|
| Epoxide, equiv./100 g. | 0.504 |
| Active hydrogen, equiv./100 g. | 0.110 |
| Total chlorine | 2.0 |

Infrared spectroscopic analysis indicated the majority of the product had the molecular configuration shown as I with a minor amount of II present.

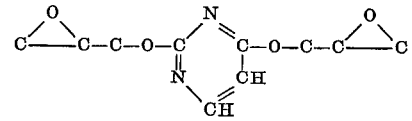

I

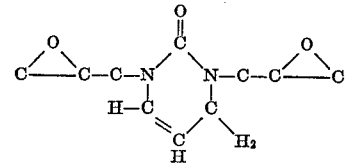

II

I claim as my invention:

1. In a process for preparing the halohydrin derivatives of carbamidyl compounds having within their structure one to four

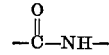

groups, which comprises reacting the carbamidyl compound with an epoxy-halo-substituted alkane, wherein the improvement comprises employing a tetrahydrocarbyl phosphonium halide catalyst.

2. A process as in claim 1 wherein the epoxy-halo-substituted alkane is epichlorohydrin.

3. A process as in claim 1 wherein the phosphonium halide is a compound of the formula (PR₃)R'X wherein R and R' are hydrocarbyl radicals containing from 1 to 20 carbon atoms, and X is a halogen selected from the group consisting of chlorine, bromine and iodine.

4. A process as in claim 1 wherein the carbamidyl compound is cyanuric acid.

5. A process as in claim 1 wherein the carbamidyl compound is urea.

6. A process as in claim 1 wherein the carbamidyl compound is uracil.

7. A process as in claim 1 wherein the phosphonium salt is methyl triphenylphosphonium bromide.

8. A process as in claim 1 wherein the phosphonium salt is methyl phenyl dilauryl phosphonium bromide.

9. In a process for preparing trichlorohydrin isocyanurate comprising reacting epichlorohydrin and cyanuric acid in a mole ratio of about 3 to 1 wherein the improvement comprises employing from 0.1% to 10% by weight of the cyanuric acid of a tetrahydrocarbyl phosphonium halide.

10. A process as in claim 9 wherein the reaction is conducted at a temperature between 50° C. and 200° C.

11. In a process for preparing triglycidyl isocyanurate which comprises reacting epichlorohydrin with cyanuric acid in a mole ratio of about 3 to 1 and then treating the resultant chlorohydrin derivative with sodium hydroxide to convert the chlorohydrin groups to glycidyl groups wherein the improvement comprises employing in the first reaction from 0.1% to 10% by weight of the cyanuric acid of a tetrahydrocarbyl phosphonium halide catalyst.

References Cited
UNITED STATES PATENTS

| | | | |
|---|---|---|---|
| 3,300,490 | 1/1967 | Budnowski | 260—248 |
| 3,288,789 | 11/1966 | Budnowski et al. | 260—248 |
| 3,337,509 | 8/1967 | Budnowski | 260—248 |

HENRY R. JILES, *Primary Examiner.*

JOHN M. FORD, *Assistant Examiner.*

U.S. Cl. X.R.

260—251, 348.6, 553, 77.5